Patented Jan. 6, 1953

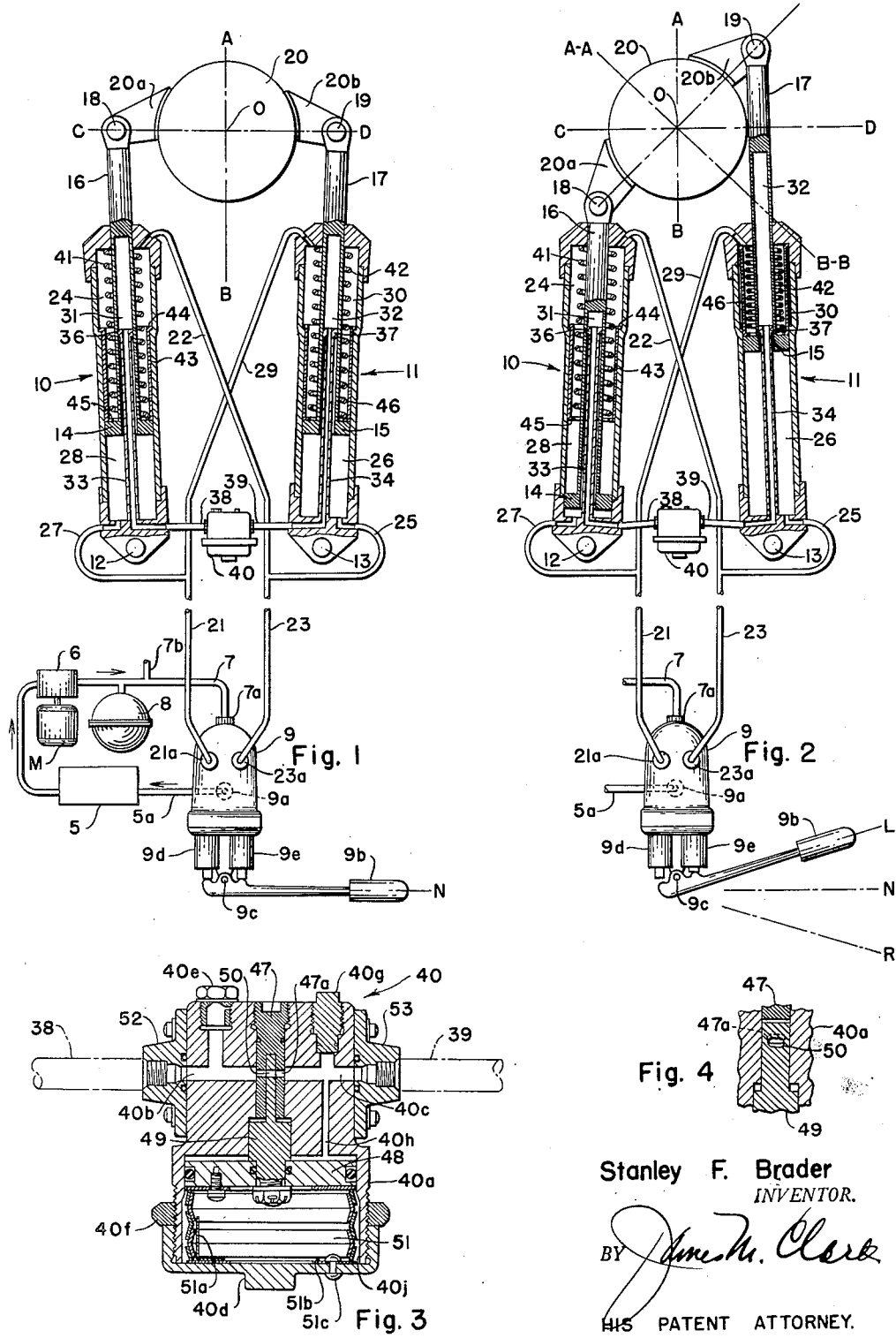

2,624,533

UNITED STATES PATENT OFFICE 2,624,533

HYDRAULIC STEERING SYSTEM

Stanley F. Brader, Hagerstown, Md., assignor to Fairchild Engine and Airplane Corporation, a corporation of Maryland Application May 5, 1950, Serial No. 160,296

12 Claims. (Cl. 244—50)

The present invention relates to the steering of vehicles and more particularly to an improved hydraulic steering system and its components for the power steering of aircraft and other vehicles.

In the ground operation of aircraft, as in the case of other vehicles, some means for steering the aircraft over the ground must be provided. This is particularly true of large and heavy aircraft, and in the case of those which are provided with tricycle type landing gears, the steering is usually accomplished either by turning the nose wheel or by allowing the nose wheel to turn or swivel and alternately applying the main wheel brakes and the engine power. The provision of mechanical steering for the nose units of small and light aircraft does not usually present very serious problems, but as aircraft are built larger and heavier the problem of steering becomes relatively more complicated and difficult to solve efficiently. This is particularly true, and the problem becomes even more difficult, when endless-track type landing gear units are used for the aircraft.

The provision of a mechanical steering system for large aircraft adds considerable weight to the airplane and it is frequently necessary in the larger aircraft to utilize power means for steering. Another problem which arises is that of suitable self-centering means for maintaining the landing units in the proper fore and aft alignment for movement along the ground during landings and take-offs and for retraction when the aircraft is in flight. A further problem lies in the provision of suitable shimmy dampening means to prevent oscillation of the gear while the aircraft is traveling over the ground. It has been customary to utilize accessory devices, usually a dash-pot means attached externally to the landing gear unit to prevent these oscillations, and these prior devices also incur additional weight, air resistance and maintenance problems.

The present invention is directed to an improved steering system, preferably utilizing fluid or hydraulic motors, which also combines in a simplified, efficient and self-contained manner the features of self-centering of the landing unit and its shimmy dampening as well. It is, accordingly, a major object of the present invention to provide an improved steering system which combines steering, self-centering and shimmy dampening in a single efficient self-contained unit. It is a corollary objective to provide an improved power steering device for the nose wheel of a tricycle type aircraft landing gear. It is a further object to provide a steering device which includes self-centering means and which insures the provision of self-centering in the event of failure of the hydraulic steering means. It is a still further object of the present invention to provide a steering device which also incorporates shimmy dampening means, as well as to insure the operation of the dampening feature despite the failure of the main hydraulic steering system. It is a still further object to provide a hydraulic steering system embodying self-centering, and shimmy dampening features for the steering of wheels, endless-track type units and other ground-engaging means for aircraft and other vehicles. Other objects and advantages of the present invention will become obvious to those skilled in the art after reading the present description considered in conjunction with the accompanying drawings, forming a part hereof, in which:

Fig. 1 is a schematic plan view showing a preferred embodiment of the improved steering system in its neutral or centered position;

Fig. 2 is a similar plan view of the movable components of the system in position for steering to the left;

Fig. 3 is a detailed cross-sectional view of the automatic metering valve for the shimmy dampening portion of the system; and Fig. 4 is a transversely sectioned view of the metering orifice portion of the valve of Fig. 3.

Referring to Fig. 1, the improved steering system comprises essentially a reservoir 5 for the hydraulic fluid which is returned to it through the return conduit 5a, and from which reservoir the fluid is drawn by the pressure pump 6 driven by the motor M. The pump 6 delivers fluid at an elevated pressure which may preferably be about 650 p. s. i. into the pressure line 7 which is open to the accumulator 8. All of the equipment thus far described is normally provided in the airplane for the hydraulic braking of the landing gear wheels and the fluid pressure to the wheel brake system is carried through the conduit 7b. The steering system is operated by means of an available balanced control valve 9 (which per se does not comprise a novel feature of the present invention other than in its combination with the other components of the system) which valve is provided with a fluid pressure inlet connection at 7a and a return outlet at 9a open to the above-mentioned return line 5a. The valve 9 is provided with an operating handle or lever 9b, pivotally mounted upon the valve casing 9c in such manner that as the handle 9b is rocked about its pivot 9c the respective plungers within the guide portions 9d and 9e are depressed or released for the actuation of the respective valves within the control unit. These plungers are each spring-biased to their centered or neutral positions as shown in Fig. 1 in which the pressure line 7 is blocked, but flow is permitted from both lines 21 and 23 through to the return line 5a.

The steering device consists essentially of two hydraulically operated cylinder units 10 and 11 which are pivoted respectively at 12 and 13 upon the aircraft structure. The cylinders 10 and 11 each contain piston elements 14 and 15, to which are attached the forwardly extending piston rods 16 and 17, respectively, and comprise fluid motors by which power steering is effected. These piston rods 16 and 17 are in turn pivotally attached to the pivots 18 and 19 provided on the brackets 20a and 20b on opposite sides of the steering post member 20. It will be understood that the post member 20 is journalled within the aircraft structure for rotation about its axis O from its neutral position in which its longitudinal axis is aligned with the fore and aft axis A—B of the airplane, toward either side for the steering of the airplane in the desired direction. In Fig. 1, the longitudinal axis A—B indicates that of both the airplane and ground-engaging unit which may be a single or dual wheel unit, an endless-track type unit such as disclosed in co-pending app. Ser. No. 37,628 filed July 8, 1948, by Jacobson, Brader and Fleck, now U. S. Patent No. 2,504,128, or other suitable ground-engaging or landing device and may incorporate suitable shock-absorbing means. The axis C—D is the transverse axis normal to the fore and aft axis A—B of the aircraft with which axis it intersects at the central axis O.

A fluid conduit 21 connects the outlet 21a at the control valve 9 with the rear chamber 28 of the left cylinder 10 through the branch conduit 27, and through an extension 29 of the conduit 21 it connects the control valve 9 with the forward chamber of the right cylinder 11. Similarly the control valve 9 is in fluid communication with the rear chamber 26 of the cylinder 11 through the conduit 23, its connection at 23a and the branch conduit 25; and the forward chamber of the cylinder 10 is in communication with the fluid conduit 23 by means of the conduit 22. The chamber or space at the forward end of the cylinder 10 is indicated by the numeral 24 while that at the rear of the left cylinder 10 is indicated by the numeral 28. Similarly, the chamber or space in the forward portion of the right cylinder 11 is indicated by the numeral 30 and that within the rear portion of the cylinder 11 is indicated by the numeral 26. Inasmuch as it is desirable, in imparting power steering movements to the post member 20, to apply fluid to the forward chamber of one cylinder while simultaneously applying fluid to the rear chamber of the other cylinder, the conduits 22 and 29, which are preferably of the flexible type, are required to be crossed as shown in Figs. 1 and 2.

The piston rod 16 contains a cylindrical bore 31 and the opposite piston rod 17 contans a similar bore 32. Tubular members 33 and 34 extend axially within the respective cylinders 10 and 11 and are fixedly attached to the rear terminals of their respective cylinders. The tubular members 33 and 34 terminate at their opposite ends in the pistons 36 and 37, respectively, and these pistons are adapted to slide within the main piston rod bores 31 and 32 as the main pistons 14 and 15 reciprocate within the cylinders 10 and 11, respectively. The chambers 31 and 32 are in communication with each other through the tubular members 33 and 34, the orificed heads of the cylinders 10 and 11, which are interconnected by the conduits 38 and 39 and through the automatic metering valve 40 which is intermediately disposed between the cylinders 10 and 11. The automatic metering valve 40 allows for expansion of the hydraulic fluid during temperature changes, within that separate closed portion of the system which terminates in the piston rod bores 31 and 32, and comprises the shimmy damping portion of the present hydraulic steering system.

As shown in Fig. 1, a compression spring 41 is disposed coaxially about the tubular portion of the piston rod 16 extending between the piston 14 and the forward end head of the cylinder 10. Similarly a compression spring 42 is provided about the tubular portion of the piston rod 17 being disposed between the piston 15 and the forward end head of the cylinder 11. Within the cylinder 10 there is provided a sleeve 43 which is adapted to slide forwardly with the piston 14 and is provided with an outwardly turned lip or flange 44 at its forward end and an inwardly turned lip 45 at its rearmost end. The outwardly turned lip 44 egages a shoulder in the bore of the cylinder 10 limiting the rearward movement of the sleeve 43, and the rearmost end lip 45 serves as a guide and retainer for the compression spring 41, limiting its extended movements to that shown in Fig. 1 and also limiting the spring urged return travel of the piston 14 in the rearward direction to that shown in this figure. The other cylinder 11 is also provided with a like sleeve 46 having similar end lip portions which likewise limit the extension of the spring 42 and the rearward spring-biased movement of the piston 15 within the cylinder 11. The springs 41 and 42 are pre-loaded against the internal lip or flange, such as the lip 45 of the sleeve 43 in the cylinder 10, and when the steering system is centered, as shown in Fig. 1, the pistons are bottomed against the inwardly turned lips and the compression springs 41 and 42. Movement of the post member 20 and its attached wheel, or other unit to be steered, in either direction compresses one spring only since the pistons move in opposite directions, and rearward movement of a piston beyond its centered position cannot be followed by its spring.

It will be noted from the above description that the present steering system consists of a small hydraulic system within a larger hydraulic system. The smaller portion of the system is confined within the bores 31 and 32 of the pistons 16 and 17 which bores are intercommunicated or interconnected by the tubular elements 33 and 34, and the cross connecting conduits 38 and 39 through the automatic metering valve 40. This smaller portion of the system provides the shimmy dampening feature of the steering assembly and being entirely independent and separate from the actuating portion of the hydraulic system, it is always effective and functions even when the actuating hydraulic system may fail in its operation. The action of steering causes the hydraulic fluid within the smaller dampening portion of the system to be transferred from one cylinder to the other. By this displacement of the fluid from one cylinder to the other, and by restricting its flow by means of an orifice, any oscillation of the unit 20 is dampened by the incompressible characteristics of the fluid within its closed system and a dash-pot effect is accomplished which provides a very effective shimmy damper. In the landing operation of an aircraft the nose wheel or nose landing unit is frequently subjected to excessive side loads. The large steering pistons 14 and 15, and their connecting conduits 21, 22, 23, 25 and 27 dampen and resist these loads and they are assisted at all times by the closed shimmy damper system defined by the hollow pistons 36 and 37.

In Fig. 3, there is shown in detail, the automatic metering valve 40 through which the dampening fluid in the closed system is forced when this fluid is displaced from one cylinder to the other. Inasmuch as the shimmy damper fluid is in a closed system in which it is imperative that all air be excluded for effective operation, the automatic valve 40 includes an air vent provided in the plug 40e as well as a filler plug and opening indicated at 40g. Also, in order that the orifice through which the fluid passes, operates satisfactorily through a full temperature range, the automatic valve 40 makes provision for varying the orifice size at 47a of the metering element and the orifice 50, of the plunger 49, with variations of viscosity of the fluid. Inasmuch as it is likewise desirable to provide an expansion chamber to allow or compensate for volumetric changes in the fluid due to temperature variations, the automatic valve 40 is provided with a piston 48 which is biased by the spring means 51.

The compensator or metering unit 40 comprises essentially a body portion 40a through which are provided the transverse bores 40b and 40c which communicate with the flexible conduits 38 and 39 through the flanged connection fittings 52 and 53, respectively. The unit body 40a is provided with a chamber or cylinder 40j in its lower portion which is enclosed by the threaded cap member 40d and retained by the lock ring 40f. The upper part of the cylinder 40j, within which the piston 48 and the spring means 51 are disposed, is in fluid communication with the bore or passage 40c by means of the communicating passage or duct 40h. The body 40a is provided with a centrally disposed bore extending from the top of the body downwardly past the transverse bores 40b and 40c within which is threadedly attached the metering element 47 provided with aligned orifices 47a (which are also shown in Fig. 4). The piston 48 has attached to it the plunger element 49 which has an upwardly extending tongue portion which is similarly orificed at 50. The spring unit 51 is maintained in alignment by a plurality of ears or clips 51a supported from the ring 51b anchored by rivets 51c.

The fluid within the closed damping portion of the system passes horizontally through the unit from the conduit 38 to conduit 39 and vice versa, depending upon the direction in which the landing unit is steered, or may tend to oscillate. As the fluid within this closed system may be caused to expand due to rise in temperature it exerts its increased pressure due to expansion through the passage 60h and against the upper face of the piston 48 forcing the piston downwardly against the opposition of the spring means 51, the ears 51a preventing buckling of the spring out of alignment. The plunger 49 and its orifice 50, being attached to the piston 48, are caused to move downwardly also, with the result that the orifice connecting the conduits 38 and 39 is restricted to the extent to which the piston is moved downwardly and the flow through the unit due to steering and displacement from one cylinder to the other, is proportionately restricted. Accordingly, since the temperature of the fluid has risen and its viscosity has been reduced, the damping effect of the fluid is maintained uniformly and compensated for by the greater restriction presented by the offset orifices 47a and 50. Similarly, as the fluid in the closed system may contract and become more viscous due to a temperature drop, the spring 51 forces the piston 48 upward, which has the effect of increasing the opening due to a better or more complete alignment of the orifices 47a and 50, to thereby allow a constant flow rate of the fluid through the unit 40. In the position of the elements shown in Fig. 3, the orifices are aligned and the parts are disposed for a relatively low operating temperature of the fluid to compensate for the viscous condition due to its low temperature. In the relative offset of the orifices as shown in Fig. 4, the temperature of the fluid is appreciably higher and the flow has been restricted to compensate for the greater fluidity of the fluid within the system.

It will, accordingly, be noted that the compensating unit 40 varies the orifice size by utilizing the expansive properties of the hydraulic fluid under temperature rise and in accordance with the variations of viscosity of the fluid. The spring-biased piston 48 also provides an expansion chamber to allow for the volumetric changes in the fluid due to the temperature variations, and the air vent 40e and the filling plug 40g assist in excluding all air from the closed portion of the system and also provide for refilling whenever it may be necessary.

The operation of the disclosed system is as follows: As shown in Fig. 2, when the operating handle 9b of the control valve 9 is moved to the forward position indicated at L for steering to the left, the hydraulic fluid under pressure within the conduit 7 entering the connection 7a is caused to flow out through the connection 23a and through the flexible conduits 23, 22 and 25, communicating with the forward chamber 24 of the cylinder 10 and with the rearward chamber 26 of the cylinder 11. It will be understood that the control of the direction of the fluid under pressure is determined by the release of the valve actuating plunger within the guide portion 9d of the control valve 9 and the movement of the corresponding plunger within the guide portion 9e. The fluid under pressure flowing into the chambers 24 and 26 causes the piston 14 to move rearwardly and the piston 15 to move forwardly such that the axis of the ground-engaging unit represented by the lines A-A—B-B is caused to move toward the left or away from the axis of the craft A—B, as shown in Fig. 2. The limit of such movement in the case of an endless-track type gear may preferably be about 45° maximum in either direction from the normal fore and aft axis, but may of course vary to suit any given installation. As the conduit 23 is placed in communication with the pressure line 7, the conduit 21 is placed in communication with the return line 5a such that the fluid displaced from the rear chamber 28 of the cylinder 10 is discharged through the branch conduit 27, and the fluid displaced by the piston 15 from the forward chamber 30 is discharged through the conduit 29, both passing through the conduit 21, thence through connection 21a and the valve 9 to the return line 5a. This, accordingly, effectuates power steering of the wheel or other ground-engaging unit mounted upon the post member which may, of course, be steered into any intermediate position to that shown and on either side of the fore and aft axis of the aircraft. At any such desired steering position when the handle 9b is released it automatically returns to the neutral position N, through the action of springs (not shown) in the valve unit 9. The system will then again be equalized and the steering post member 20 is returned to its centered position under the influence of the spring 42 causing the piston 15 to be moved rearwardly to its initial position as shown in Fig. 1. As the pressure of the fluid within the forward chamber 24 of the cylinder 10 is relieved through the control valve 9 and the return line 5a, the piston 14 is drawn forwardly by the rearward movement of the piston 15 transmitted through the pivots 19, 18 and brackets 20a and 20b of the post member 20, until the piston 14 bottoms against the inwardly turned flange 45 of the sleeve 43. Accordingly, as one piston moves in one direction it compresses the spring within its cylinder while the other piston, moving in the opposite direction, leaves its spring held against the inwardly turned flange of its respective sleeve, as in cylinder 10 in Fig. 2. The sleeve 46 in the opposite cylinder 11, however, is caused to move forward until it reaches the piston rod end fitting of the cylinder, compressing the spring 42 within its length and thereby limiting the forward movement of the piston 15. The springs 41 and 42, therefore, provide positive self-centering of the unit at any time that steering is not being used in taxiing an aircraft straight away or in landing and in taking-off. Accordingly, in the event of failure of the hydraulic system, alignment of the unit is maintained by built-in trail while taxiing, and upon take-off and while in flight is held centered automatically by means of the springs 24 and 30 in steering cylinders 43 and 11 respectively. The springs 24 are not sufficiently powerful to align the landing unit while taxiing but the alignment is maintained to a greater extent by the trail angle of the landing unit which can be more easily overcome at low speeds when it is desired to steer the endless track or landing unit. With the handle 9b in the neutral position N the cylinders 10 and 11 are not hydraulically locked and are unrestricted, other than the centering effect of the springs and the damping effects described above; the lines 21 and 22 both being open to return line 5a and therefore the ground-engaging element is permitted to swivel freely depending on the forces to which it may be subjected in addition to the centering and damping restraints referred to.

Other forms and modifications of the present invention, both with respect to its general arrangement and the details of its respective parts which may occur to those skilled in the art after reading the present description, are intended to come within the scope and spirit of the present invention as more particularly defined in the appended claims.

I claim:

1. In a hydraulic steering system for aircraft, a ground-engaging member, a pair of hydraulic motors connected to said ground-engaging member for steering movements thereof, each said motor including a tubular piston rod a source of fluid pressure, control valve means for directing said fluid pressure to either end of each of said hydraulic motors for extension of one and retraction of the other motor, and damping means including a piston telescopical within the piston in each said hydraulic motor for damping oscillations to which said ground-engaging element may be subjected.

2. In a steering system for aircraft including a ground-engaging element, fluid motor means connected to said ground-engaging element, a main source of fluid pressure, control means for selectively directing said fluid pressure to said fluid motor means for the steering of said ground-engaging element, resilient means associated with said fluid motor means for urging said ground-engaging element into a centered position and means including a piston and hollow piston rod for defining a separate fluid circuit distinct from said main fluid pressure source for damping oscillations of said ground-engaging element.

3. In a steering system for aircraft including a ground-engaging element, fluid motor means including a hollow piston rod means connected to said ground-engaging element, a source of fluid power, control means for selectively directing said fluid to the respective ends of said fluid motor for the steering of said ground-engaging element, resilient means associated with said fluid motor means for urging said ground-engaging element into a centered position and means including a fixed piston cooperable with the hollow piston rod of said fluid motor means for defining a separate fluid circuit for damping oscillations of said ground-engaging element.

4. A fluid motor for the steering of an aircraft component including a cylinder, a piston movable within said cylinder, a piston rod fixed to said piston and extendible through the rod end of said cylinder, said cylinder having an increased diameter portion at said rod end, a sleeve element having outwardly extending lip means engageable with the end of said enlarged diameter portion of said cylinder, said sleeve element having inwardly extending lip means engageable with a face of said piston, a compression spring interposed between said inwardly directed lip means of said sleeve element and the rod end of said cylinder arranged to return said piston to a centered position of said component.

5. A fluid motor for the steering of an aircraft landing gear unit including a cylinder, a piston movable within said cylinder, a piston rod fixed to said piston and extendible through the rod end of said cylinder, said cylinder having an increased diameter portion at said rod end, a sleeve element having outwardly extending lip means engageable with the end of said enlarged diameter portion of said cylinder, said sleeve element having inwardly extending lip means engageable with a face of said piston, a compression spring interposed between said inwardly directed lip means of said sleeve element and the rod end of said cylinder, said piston arranged to overcome said spring and move said sleeve element therewith to a limiting position of said piston toward said rod end of said cylinder at which it is resiliently opposed by said compression spring.

6. In a steering system for aircraft including a ground-engaging member, a pair of piston-cylinder fluid motors interconnected between fixed structure and opposite sides of said ground-engaging member, a source of fluid pressure, fluid connections at the ends of said fluid motor on each side of the piston therein, control means for placing the fluid connection at the piston rod end of one motor and the piston end of the opposite motor in connection with said fluid power source for steering said ground-engaging member in a desired direction and means including a variable volume chamber associated with each said fluid motor interconnected by a conduit separate from said fluid connections for containing an enclosed fluid displaceable from one fluid motor into the other arranged for damping oscillations to which said ground-engaging member may be subjected.

7. In a steering system for aircraft including a ground-engaging member, a pair of fluid motors pivotally interconnected between fixed aircraft structure and opposite sides of said ground-engaging member, each said motor including piston and cylinder elements, a source of fluid pressure, fluid connections at the ends of said fluid motor on each side of the said piston therein, control valve means for placing the fluid connection at the piston rod end of one motor and the piston end of the opposite motor in connection with said fluid power source for steering said ground-engaging member in a desired direction, and means including a hollow piston associated with each said fluid motor interconnected by a conduit for containing an enclosed fluid displaceable from one fluid motor into the other upon steering movements arranged for damping oscillations to which said ground-engaging member may be subjected.

8. In a hydraulic steering system for aircraft, a ground-engaging member mounted upon the aircraft for steering movements, a fluid motor interconnecting said ground-engaging member with fixed aircraft structure, a source of fluid pressure, control means for selectively directing said fluid under pressure to actuate said fluid motor for the selective steering of said ground-engaging member, said fluid motor having a tubular piston-rod and a fixed piston reciprocable in said tubular piston-rod defining a separate fluid system for the damping of oscillations to which said ground-engaging member may be subjected, and variable capacity means within said separate fluid system arranged to supply and receive the damping fluid required for and displaced from said fluid motor when selectively actuated by said control means.

9. In a hydraulic steering system for aircraft, a ground-engaging member mounted upon the aircraft for steering movements, a fluid motor interconnecting said ground-engaging member with fixed aircraft structure, a source of fluid pressure, control means for selectively directing said fluid under pressure to said fluid motor for the selective steering of said ground-engaging member, said fluid motor having a tubular piston-rod and a fixed piston reciprocable within said tubular piston rod defining a separate fluid system for the damping of oscillations to which said ground-engaging member may be subjected, variable capacity means arranged to supply and receive the damping fluid required for and displaced from said fluid motor when selectively actuated by said control means, and temperature responsive means disposed within said damping fluid for maintaining a constant flow rate of said damping fluid within said separate fluid system.

10. In a steering system for aircraft, a ground-engaging element swivellably mounted upon the aircraft structure, a double-acting fluid motor having piston and cylinder elements, said motor pivotally interconnecting the aircraft structure and said ground-engaging element, a source of fluid pressure, connections to the ends of said fluid motor on opposite sides of said piston, control valve means for selectively directing said fluid from said pressure source to one end of said cylinder and for the return of displaced fluid from the opposite end of said cylinder, resilient means co-axially disposed about said piston rod interposed between said rod end of said cylinder and said piston for urging said piston away from said rod end of said cylinder and flanged sleeve means reciprocably mounted within said cylinder about said resilient means for limiting the approaching movement of said piston toward said rod end of said cylinder and for limiting the effectiveness of said resilient means in urging said piston in the opposite direction for establishing a centered position of said ground-engaging element with respect to the aircraft structure.

11. In a steering system for aircraft, a ground-engaging element swivellably mounted upon the aircraft structure, a double-acting fluid motor having piston and cylinder elements, said motor pivotally mounted upon the aircraft structure and to said ground-engaging element, a source of fluid pressure, connections to the ends of said fluid motor on opposite sides of the piston element reciprocably mounted therein, control valve means for selectively directing said fluid from said pressure source to one end of said cylinder and for the return of displaced fluid from the opposite end of said cylinder, resilient means co-axially disposed about said piston rod interposed between an end of said cylinder and said piston for urging said piston away from said end of said cylinder, and flanged sleeve means reciprocably mounted within said cylinder and about said resilient means for limiting the approaching movement of said piston toward said end of said cylinder and for limiting the effectiveness of said resilient means in urging said piston in the opposite direction for establishing a centered position of said ground-engaging element with respect to the aircraft structure.

12. In a hydraulic steering system for aircraft: a ground-engaging member; a pair of hydraulic motors connected to said ground-engaging member for steering movements thereof; a source of fluid pressure; control means for directing said fluid pressure to either end of each of said hydraulic motors for extension of one and retraction of the other motor; conduit means in circuit with said fluid pressure source, said control means and said motors defining a steering fluid circuit; variable volume means formed within each said hydraulic motor; further conduit means connecting the variable volume means of each of said hydraulic motors defining a separate fluid circuit; and damping means disposed in said further separate conduit means including a restricted path of fluid displaced from one of the said variable volume means of one of said hydraulic motors into the other for damping oscillations to which said ground-engaging member may be subjected.

STANLEY F. BRADER.

REFERENCES CITED

The following references are of record in the file of this patent:

UNITED STATES PATENTS

| Number | Name | Date |
| --- | --- | --- |
| 1,969,736 | Erling | Aug. 14, 1934 |
| 2,044,777 | Erling | June 23, 1936 |
| 2,199,681 | Timm | May 7, 1940 |
| 2,270,943 | Freundel | Jan. 27, 1942 |
| 2,279,074 | Stearman | Apr. 7, 1942 |
| 2,345,405 | Maclaren | Mar. 28, 1944 |